United States Patent Office 2,742,467
Patented Apr. 17, 1956

2,742,467
HYPOTENSIVE DRUGS

Walther Persch, Frankfurt am Main-Hochst, Germany, assignor to Farbwerke Mainkur Aktiengesellschaft, Frankfurt (Main)-Fechenheim, Germany, a German company No Drawing. Application June 21, 1954,
Serial No. 438,297

Claims priority, application Germany July 8, 1953

3 Claims. (Cl. 260—250)

This invention relates to agents capable of reducing the blood pressure.

I have found that agents capable of reducing the blood pressure are obtained by acting with (I) a compound of the general formula

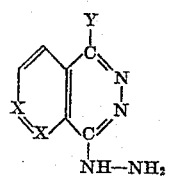

NH—NH$_2$ wherein one X means CH, the other X a ring member of the group consisting of CH and N, Y means a radical of the group consisting of hydrogen, alkyl, alkyloxy and the hydrazine group, and (II) a dialkylxanthine, or the respective salts of these two groups of compounds, on each other to form a salt.

The compounds thereby obtained correspond to the general formula

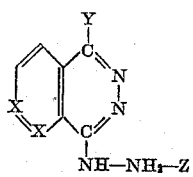

NH—NH$_2$—Z wherein the X's have the same significance as in the above formula; Y means hydrogen, alkyl, alkyloxy or NH.NH$_2$.Z; and Z maens a dialkylxanthine. These new compounds exhibit the action of both of their components and are distinguished by a better compatibility than the simple inorganic salts of the components I.

The following examples are given for the purpose of illustrating the invention, the temperatures being in degrees centigrade.

Example 1

14.05 grams of the dihydrochloride of 1.4-dihyrazino-phthalazine are dissolved in 200 cubic centimeters of water. To this solution there is added an aqueous solution of 20.2 grams of theobromine-sodium (2 moles) in 200 cubic centimeters of water. A yellowish, sandy precipitation forms slowly; it is filtered by suction and washed with water. The substance is the theobromine-dihydrazinophthalazine compound of the formula

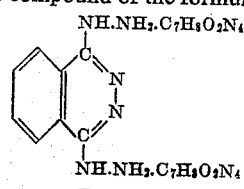

Example 2

118.8 grams of theophylline+1 H$_2$O are dissolved together with 12 grams of solid caustic soda and 400 cubic centimeters of warm water. To this clear solution, there is added a solution of 84.3 garms of the dihydrochloride of 1.4-dihydrazinophthalazine in 500 cubic centimeters of water. The product which has crystallized out is filtered by suction, washed with water until free of chlorine and dried in a vacuum at 30°. The product has the same empirical formula as in Example 1 the reaction product with theobromine.

Example 3

1/100 mole=2.64 grams, of the dihydrochloride of 1.4-dihydrazino-6-azaphthalazine are dissolved in 100 cubic centimeters of water. 4.04 grams of theobromine sodium in 50 cubic centimeters of water are then added. The orange-colored precipitation thereby gradually formed is filtered by suction, washed with water, and dried at 40° in a vacuum. It is the salt between 2 moles of theobromine and 1 mole of the dihydrazinoazaphthalazine compound and corresponds to the formula

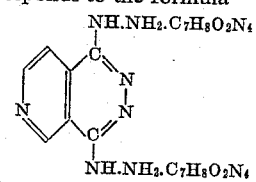

A similar salt can be produced with the theophylline-sodium salt and the sulfate of 1.4-dihydrazino-6-azaphthalazine.

Example 4

To a solution of 1.97 grams of the monohydrochloride of 1-hydrazinophthalazine in 150 cubic centimeters of water, there is added a solution of 2.02 grams of theobromine-sodium in 25 cubic centimeters of water. The yellow precipitation, which slowly forms, is filtered by suction and dried. It is the mono theobromine salt of the 1-hydrazinophthalazine.

Similar mono theobromine salts are obtained when 1-hydrazinophthalazine is replaced by 1-hydrazino-4-methyl-phthalazine or by 1-hydrazino-4-methoxy-phthalazine.

I claim:

1. The new compounds capable of reducing the blood pressure and corresponding to the general formula

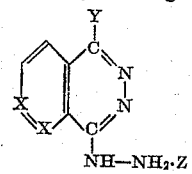

NH—NH$_2$·Z wherein one X means CH, the other X a ring member of the group consisting of CH and N; Y means a radical of the group consisting of methyl, methyloxy and NH.NH$_2$.Z; and Z is dimehtylxanthine.

2. The new compound capable of reducing the blood pressure and corresponding to the formula

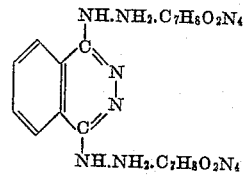

wherein C$_7$H$_8$O$_2$N$_4$ means theophylline.

3. The new compound capable of reducing the blood pressure and corresponding to the formula

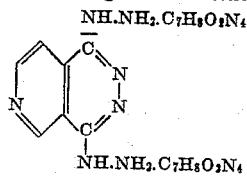

wherein C$_7$H$_8$O$_2$N$_4$ means theobromine.

No references cited.